United States Patent
Springberg et al.

(10) Patent No.: US 10,175,902 B2
(45) Date of Patent: Jan. 8, 2019

(54) MANAGING HOST COMMUNICATION WITH A REGULATOR IN A LOW POWER MODE

(71) Applicant: MICRON TECHNOLOGY, INC., Boise, ID (US)

(72) Inventors: David Matthew Springberg, Fort Collins, CO (US); Matthew David Rowley, Boise, ID (US); Peter Edward Kaineg, Boise, ID (US)

(73) Assignee: Micron Technology, Inc., Boise, ID (US)

(*) Notice: Subject to any disclaimer, the term of this patent is extended or adjusted under 35 U.S.C. 154(b) by 69 days.

(21) Appl. No.: 15/194,202

(22) Filed: Jun. 27, 2016

(65) Prior Publication Data

US 2017/0371574 A1 Dec. 28, 2017

(51) Int. Cl.
 *G06F 3/06* (2006.01)
 *G06F 13/40* (2006.01)
 *G06F 13/42* (2006.01)
 *G06F 13/16* (2006.01)

(52) U.S. Cl.
 CPC .......... *G06F 3/0625* (2013.01); *G06F 3/0634* (2013.01); *G06F 3/0688* (2013.01); *G06F 13/1668* (2013.01); *G06F 13/4068* (2013.01); *G06F 13/4282* (2013.01); *G06F 2213/0026* (2013.01); *G06F 2213/0032* (2013.01)

(58) Field of Classification Search
 CPC .... G06F 1/3206; G06F 1/3268; G06F 1/3275; G06F 3/0625; G06F 3/0634; G06F 3/0688; Y02B 60/1228; Y02B 60/1246
 See application file for complete search history.

(56) References Cited

U.S. PATENT DOCUMENTS

| | | | | |
|---|---|---|---|---|
| 2014/0156924 A1* | 6/2014 | Jeon | ........................ | G11C 5/147 711/108 |
| 2014/0281600 A1* | 9/2014 | Wells | .................... | G06F 1/3275 713/320 |
| 2014/0372777 A1* | 12/2014 | Reller | ................... | G06F 1/3253 713/320 |
| 2015/0268870 A1* | 9/2015 | Brewer | ..................... | G06F 9/38 711/103 |

* cited by examiner

*Primary Examiner* — Terrell S Johnson
(74) *Attorney, Agent, or Firm* — Fletcher Yoder, P.C.

(57) ABSTRACT

A solid-state drive (SSD) includes a connector communicatively coupling the SSD to a host device, a controller coupled to the connector, and a memory device. The SSD also include a regulator configured to receive an instruction to enter a low power mode of the SSD, enter the low power mode upon receipt of the instruction, receive an indication to exit the low power mode, and exit the low power mode upon receipt of the indication.

18 Claims, 3 Drawing Sheets

MANAGING HOST COMMUNICATION WITH A REGULATOR IN A LOW POWER MODE

BACKGROUND

Field of Invention

Embodiments of the invention relate generally to the field of solid-state drives (SSDs). More specifically, embodiments of the present invention include one or more systems, devices, and methods for efficiently providing a low power mode of the SSD.

Description of Related Art

A solid-state drive (SSD) uses one or more integrated circuits to store data persistently. Typically, the SSD includes at least a memory device (e.g., a non-volatile NAND memory device) that stores data, a controller that bridges the memory device to a host device, a connector that communicatively couples to the host device via a host interface (e.g., PCI Express (PCIe), Serial ATA (SATA), etc.), and one or more power management components, including a voltage regulator, that manages power for the SSD. The SSD may include a low power mode (e.g., the L1.2 state for PCIe, the DevSlp mode for SATA, etc.) that enables the SSD to use less power when the SSD is not in use. The low power mode may be especially useful for battery-powered mobile devices for which longer battery lifetime is desirable, such as laptops, tablets, phones, wearable devices, and the like.

In the low power mode, the controller may use a complex power islanding scheme to reduce the power used by the controller (e.g., by turning off blocks of the controller that are not used during the low power mode). However, at least some blocks in the controller (e.g., a host interface) remain powered to monitor the host device for a signal to exit the low power mode. Simultaneously, the voltage regulator also remains powered to supply power to these blocks. When the host interface receives the signal from the host device to exit the low power mode, the unpowered blocks of the controller may not immediately be powered up. Instead, a powered block of the controller sends a signal to the voltage regulator to power up unpowered components of the SSD, without which the unpowered blocks of the controller may not be powered up. Once the other unpowered components of the SSD are powered up, the unpowered blocks of the controller may then power up. This conventional scheme has certain drawbacks relating to power consumption, time-to-ready speed, and design complexity.

Accordingly, embodiments of the present invention may be directed to one or more of the problems set forth above.

DETAILED DESCRIPTION

As is described in detail below, one or more power management components, including a voltage regulator, of a solid-state drive (SSD) may be configured to monitor a host device communicatively coupled to the SSD for a signal to exit a low power mode (e.g., a power on signal) when the one or more power management components are in the low power mode. When the power on signal is detected by the regulator, the regulator may power up the SSD. As such, in the low power mode, the controller may not monitor the host device for the power on signal. In some embodiments, the controller may completely power off. In this manner, the SSD may consume less power overall. Moreover, the SSD may power up in less time because the regulator detects the power on signal and may immediately power up one or more SSD components without which the controller may not be powered up, instead of the controller first sending a signal to the regulator directing the regulator to power up the one or more SSD components. The design of the controller may also be simplified by reducing or eliminating the complexity of power islanding schemes.

Figure 1:
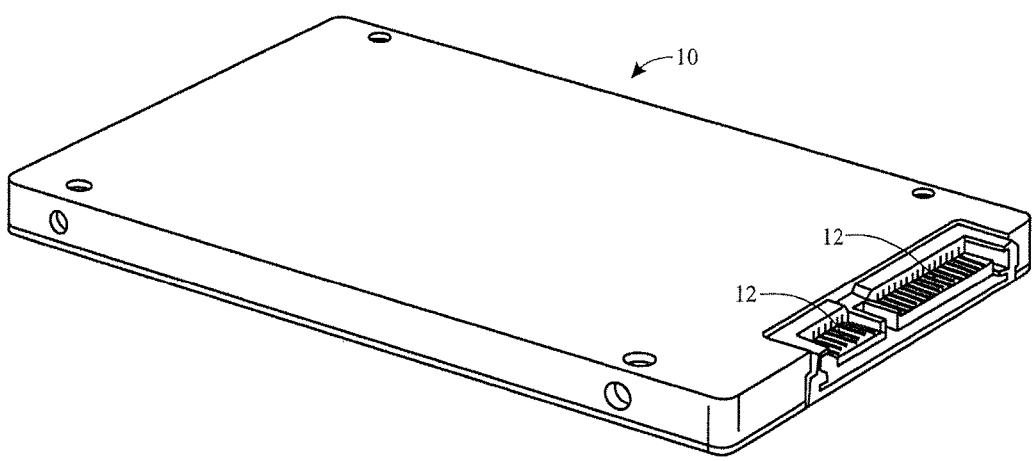
FIG. 1 illustrates a solid-state drive (SSD), in accordance with an embodiment of the present disclosure.

FIG. 1 illustrates a solid-state drive (SSD) 10, in accordance with an embodiment of the present disclosure. The SSD 10 may include a connector 12 that enables the SSD 10 to communicatively couple to a host device (e.g., a host computing device). The connector 12 may provide a host interface to the host device and enable communication between the SSD 10 and the host device via a computer bus standard. For example, the computer bus standard used by the connector 12 may include the Serial AT Attachment (SATA) standard, the Peripheral Component Interconnect Express (PCIe) standard, the Serial Attached SCSI (SAS) standard, the Universal Serial Bus (USB) standard, Parallel AT Attachment (PATA) standard, Parallel (SCSI) standard, or any other suitable computer bus standard. The host device may be any suitable computing device, such as a computer, PC, laptop, server, tablet, cell phone, mobile device, wearable device, and the like.

Figure 2:
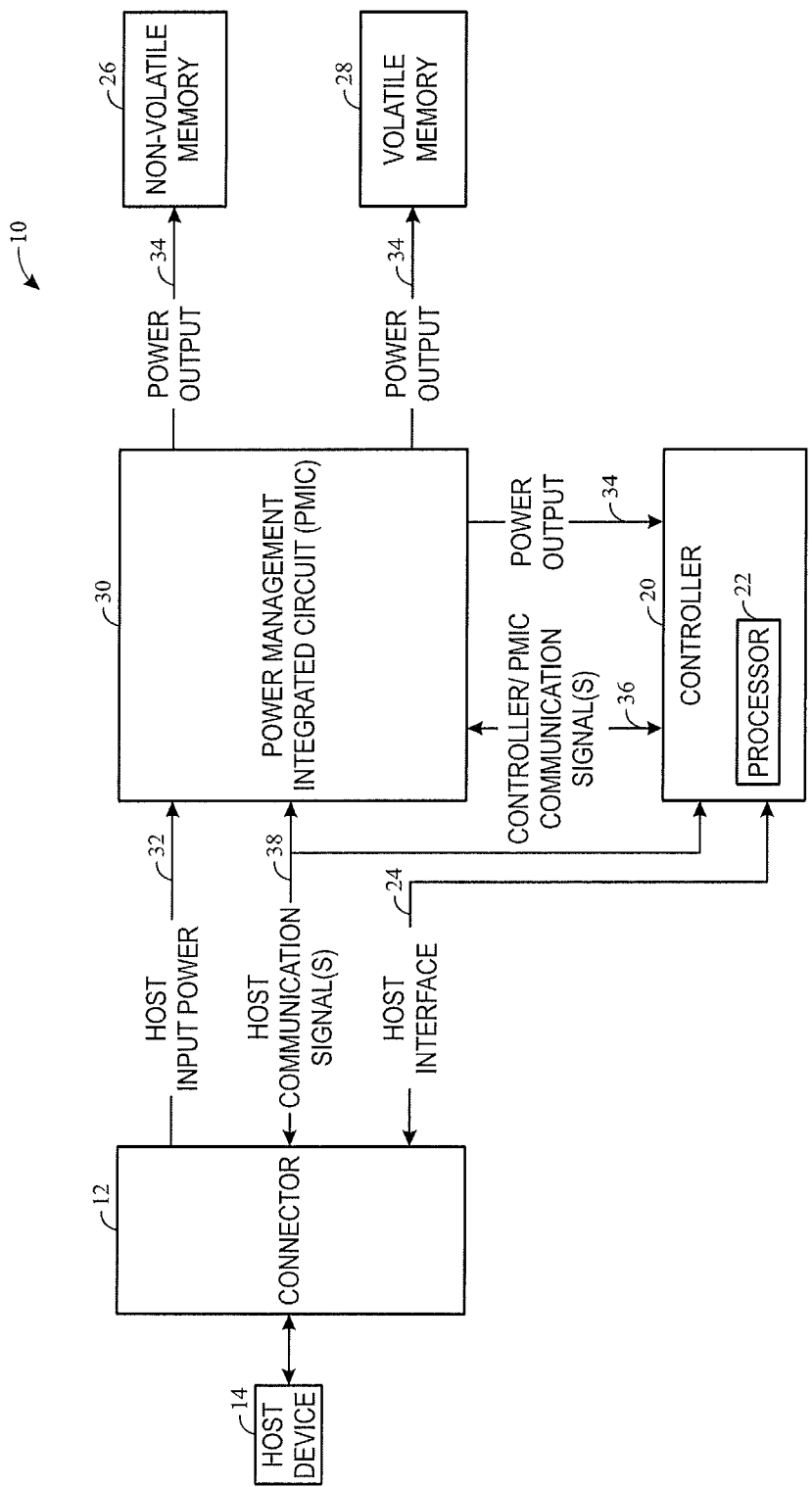
FIG. 2 illustrates a block diagram of the SSD of FIG. 1, in accordance with an embodiment of the present disclosure.

FIG. 2 illustrates a block diagram of the SSD 10 of FIG. 1, in accordance with an embodiment of the present disclosure. The SSD 10 includes a controller 20 that may include a processor 22 (e.g., a microprocessor) that may execute firmware and/or software, such as firmware for controlling the SSD 10. Moreover, the processor 22 may include multiple microprocessors, one or more "general-purpose" microprocessors, one or more special-purpose microprocessors, or some combination thereof. For example, the processor 22 may include one or more reduced instruction set computing (RISC) processors. The controller 20 may perform a variety of functions for controlling the SSD 10, including error-correcting code, read and write caching, encryption, and the like. The controller 20 may communicate with a host device 14 via the connector 12. The connector 12 may provide a host interface 24 that enables communication between the SSD 10 and the host device 14 via the computer bus standard (e.g., SATA, PCIe, etc.).

The SSD 10 may also include one or more memory devices, such as a non-volatile memory device 26, a volatile memory device 28, or a combination thereof. The non-volatile memory device 26 may be any suitable memory device that retains data when power is not provided. The non-volatile memory device 26 may include a flash memory, a read-only memory, a ferroelectric random access memory (F-RAM), a magnetic computer storage device, and the like. For example, the non-volatile memory device 26 may include a NAND-based flash memory. The volatile memory device 28 may be any suitable memory device that uses power to retain data. The volatile memory device 28 may include a dynamic random-access memory, a static random-access memory, and the like. The memory device(s) 26, 28 may store information such as control software, look up tables, configuration data, etc. The memory device(s) 26, 28 may store a variety of information and may be used for various purposes. For example, the memory device(s) 26, 28 may store machine-readable and/or processor-executable instructions (e.g., firmware or software) for the processor 22 to execute, such as instructions for controlling the SSD 10.

The SSD 10 may include one or more power management components, including one or more voltage regulators, that manage power for components of the SSD 10. In some embodiments, the power management components may be part of an integrated circuit, such as a power management integrated circuit (PMIC) 30. It should be noted that the techniques disclosed may be used on any form of power management components that include a voltage regulator. While, in the present disclosure, references may be made to the power management components as a "PMIC," it should be borne in mind that this is only one particular area of applicability of the technology, and the disclosure should not be understood as limiting it to such applications. With that in mind, the PMIC 30 may receive power (e.g., host input power 32) from the host device 14 via the connector 12. The PMIC 30 may convert or change characteristics of the host input power 32 based on the power used by the components of the SSD 10 via one or more voltage regulators of the PMIC 30. The PMIC 30 may output the resulting power (power outputs 34) to the components of the SSD 10 (e.g., the non-volatile memory device 26, the volatile memory device 28, the controller 20, etc.). The PMIC 30 may communicatively couple to the controller 20 such that the PMIC 30 and the controller 20 may send and receive signals 36 to and from each other.

The host device 14 may communicatively couple to the PMIC 30 and the controller 20 via the connector 12. The connector 12 may enable the host device 14 to send and receive host communication signals 38 to and from the PMIC 30 and the controller 20. In some embodiments, the connector 12 may enable the host device 14 to send a sideband signal to the PMIC 30 and the controller 20. The sideband signal may provide functionality for, but may not be directly involved in, data transfers. For example, the connector 12 may enable the host device 14 to send the sideband signal to the PMIC 30 and the controller 20 for the SSD 10 to enter a low power mode or exit the low power mode.

Figure 3:
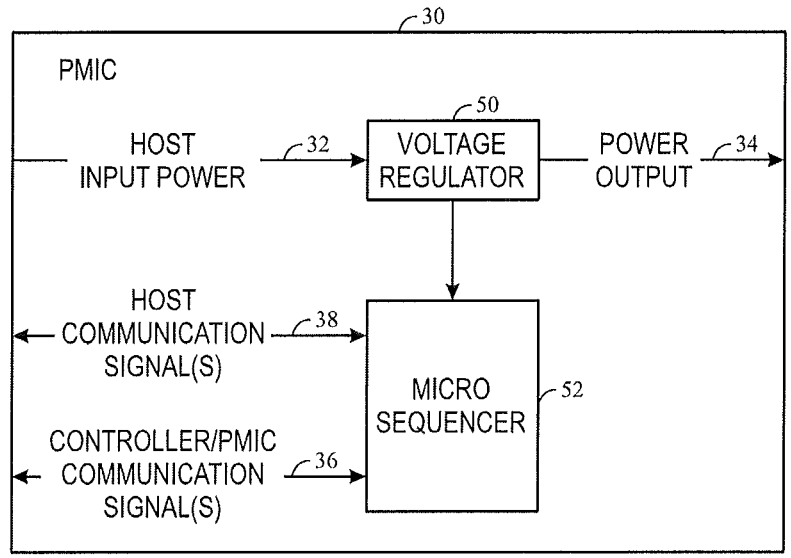
FIG. 3 illustrates a block diagram of a power management integrated circuit of FIG. 2, in accordance with an embodiment of the present disclosure.

FIG. 3 illustrates a block diagram of the PMIC 30 of FIG. 2, in accordance with an embodiment of the present disclosure. The PMIC 30 may include one or more voltage regulators 50 that converts or changes characteristics of the host input power 32 based on the power used by the components of the SSD 10. For example, the voltage regulator 50 may include a buck regulator, step-down converter, and/or a direct current (DC)-to-DC converter, that steps down voltage and steps up current of the host input power 32, based on the power used by the components of the SSD 10. The regulator 50 may couple to components of the SSD 10 external to the PMIC 30 and output power 34 to the components.

The PMIC 30 may also include a microsequencer 52 that sequences instructions to control the PMIC 30. For example, the microsequencer 52 may sequence instructions to power up and/or power down the SSD 10. The instructions may be stored in the microsequencer 52, the non-volatile memory device 26 of the SSD 10, the volatile memory device 28 of the SSD 10, or any combination thereof. In some embodiments, the microsequencer 52 may be a microcontroller. The microcontroller may be a system on a chip (SoC) including a processor core, a memory, and programmable input/output peripherals. The microsequencer 52 may be programmable or not programmable. In some embodiments, the microsequencer 52 may be a state machine. For example, the microsequencer 52 may include hardcoded logic that processes a host communication signal 38 that instructs the SSD 10 to enter the low power mode and/or exit the low power mode.

Figure 4:
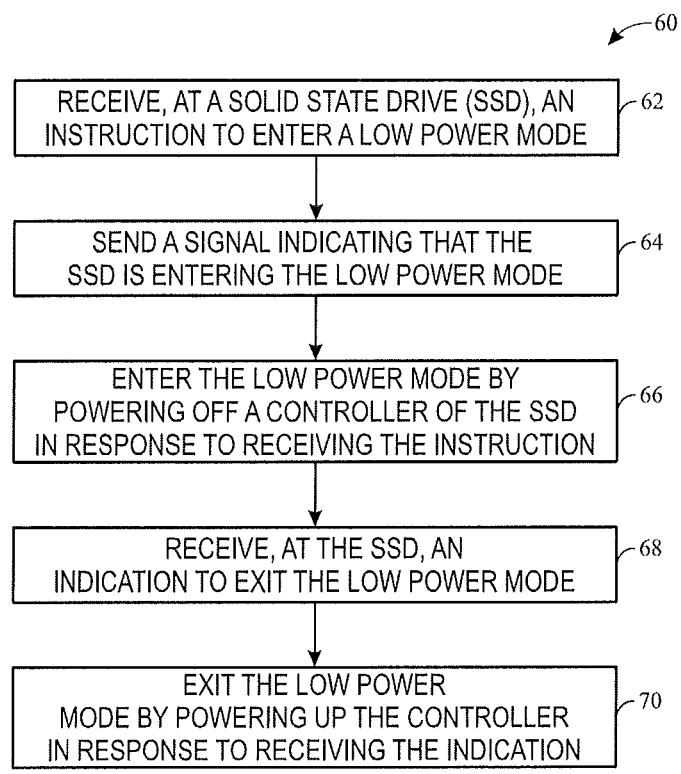
FIG. 4 is a flowchart of a method for controlling the SSD of FIGS. 1 and 2 to enter and exit a low power mode, in accordance with an embodiment of the present disclosure.

FIG. 4 is a flowchart 60 of a method for controlling the SSD 10 of FIGS. 1 and 2 to enter and exit the low power mode, in accordance with an embodiment of the present disclosure. The method begins when the regulator 50 of the PMIC 30 of the SSD 10 receives (block 62) an instruction to enter the low power mode. For example, the host device 14 may send a command to the controller 20 of the SSD 10 to enter the low power mode. In some embodiments, the controller 20 may enter the low power mode after a duration of time has passed (e.g., as determined by an internal timer of the controller 20). The controller 20 may then send an instruction or command to the regulator 50 to enter the low power mode.

The regulator 50 (block 64) then sends a signal indicating that the SSD 10 is entering the low power mode. For example, the host interface 24 of the SSD 10 may use the PCIe bus standard. As such, a host communication signal 38 (e.g., on a data line between the host device 14 and the PMIC 30/controller 20) may include a sideband signal, CLKREQ#. The regulator 50 may de-assert the CLKREQ# signal to indicate that the SSD 10 is entering an L1 substate (e.g., the L1.2 substate). The L1 state and L1.2 substate are low power modes specified by the PCIe standard. In some embodiments, the host interface 24 of the SSD 10 may use other bus standards, and the regulator 50 may send a corresponding signal indicating that the SSD 10 is entering a corresponding low power mode, as specified by the other bus standards. For example, the host interface 24 of the SSD 10 may use the SATA bus standard, and the regulator 50 may send an indication via a DevSlp signal indicating that the SSD 10 is entering a DevSlp ("device sleep") low power mode. In some embodiments, the regulator 50 may send a signal (e.g., 36) to the controller 20 indicating that the SSD 10 is entering the low power mode and/or the controller 20 is powering down.

After sending the signal, the regulator 50 (block 66) enters the low power mode by powering down the controller 20 of the SSD 10 in response to receiving the instruction to enter the low power mode. The regulator 50 may power down the controller 20 such that the controller 20 does not monitor the host device 14 for a signal to exit the low power mode. In some embodiments, powering down the controller 20 may include still powering some blocks of the controller 20, as long as the block(s) of the controller 20 that monitor the host device 14 for the signal to exit the low power mode are powered off. The regulator 50 may also power down other components of the SSD 10, such as any combination of power supplies, memory devices 26, 28, and the like. In some embodiments, the regulator 50 may completely power off the controller 20. In some embodiments, the regulator 50 and/or the controller 20 may determine whether there is an indication to not enter the low power mode. For example, in embodiments employing the PCIe bus standard, the regulator 50 and controller 20 may confirm that the CLKREQ# signal is de-asserted on the data line of the host communication signal 38 between the host device 14 and the PMIC 30/controller 20. In some embodiments, the host device 14 may indicate that the low power mode should not be entered (e.g., because of user activity, resource-intensive processes that are currently or soon to be running, and the like) by re-asserting the CLKREQ# signal. In such embodiments, if the host device 14 indicates that the low power mode should not be entered, the SSD 10 does not enter the low power mode. Once the regulator 50 and controller 20 confirm that the CLKREQ# signal is de-asserted, the regulator 50 may then enter the low power mode by powering down the controller 20.

At a later point in time, the regulator 50 (block 68) receives an indication to exit the low power mode. For example, the regulator 50 may monitor a data line of the host communication signal 38 between the host device 14 and the PMIC 30/controller 20. In embodiments employing the PCIe bus standard, if the regulator 50 detects an assertion of the CLKREQ# signal, the regulator 50 receives an indication to exit the low power mode (e.g., a power on signal). In some embodiments, the instruction may be sent by the host device 14 because of user activity, performing resource-intensive processes, and the like.

Finally, the regulator 50 (block 70) exits the low power mode by powering up the controller 20 in response to receiving the indication to exit the low power mode. In some embodiments, the regulator 50 may first power up components of the SSD 10, without which the controller 20 may not itself power up. For example, in embodiments employing the PCIe bus standard, the regulator 50 may first power up any combination of power supplies, memory devices 26, 28, and the like, of the SSD 10, while asserting a reset signal, as specified by the PCIe bus standard. The reset signal indicates whether the SSD 10 is being reset. Once the relevant components of the SSD 10 are powered up and stable, the reset signal is de-asserted. The controller 20 may then power up for normal operation.

In some embodiments, the controller 20 may perform a "warm" boot to power up. The warm boot is performed when the controller 20 detects that it is powering up from the low power state, as opposed to a "cold" boot which occurs when the controller 20 powers up from a state where the entire SSD 10 is completely powered off. The controller 20 may determine whether to perform the warm boot or the cold boot based on reading data maintained during the low power mode. The data may be stored in any combination of one or more status registers of the regulator 50, one or more registers of the microsequencer 52, one or more registers of the controller 20 driven by the regulator 50, the non-volatile memory 26, and the like.

As a result, the method enables the SSD 10 to consume less power when in the low power mode by reducing or eliminating power consumed by the controller 20. Moreover, the SSD 10 may power up in less time because the regulator 50 detects the power on signal and may immediately power up one or more SSD components without which the controller 20 may not be powered up, instead of the controller 20 first sending a signal to the regulator 50 directing the regulator 50 to power up the one or more SSD components. The design of the controller 20 may also be simplified by reducing or eliminating the complexity of power islanding schemes.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A solid-state drive (SSD), comprising:
   a connector configured to communicatively couple the SSD to a host device;
   a data line coupled to the host device and a regulator of the SSD, wherein the data line is configured to:
      enable communication between the SSD and the host device via the connector; and
      send an indication that a low power mode should not be entered;
   a controller configured to control the SSD;
   a memory device;
   the regulator configured to:
      receive an instruction to enter the low power mode of the SSD;
      enter the low power mode upon receipt of the instruction in response to determining the indication on the data line that the low power mode should not be entered is not being sent;
      receive an indication to exit the low power mode; and
      exit the low power mode upon receipt of the indication.

2. The SSD of claim 1, wherein the regulator is configured to be communicatively coupled to the host device via the connector.

3. The SSD of claim 1, wherein the connector is configured to communicatively couple the SSD to the host device via a host interface using a computer bus standard.

4. The SSD of claim 3, wherein the computer bus standard is the PCI Express (PCIe) standard.

5. The SSD of claim 3, wherein the computer bus standard is the Serial ATA (SATA) standard.

6. The SSD of claim 1, wherein receiving the instruction to enter the low power mode of the SSD comprises receiving the instruction from the controller.

7. The SSD of claim 6, wherein the instruction is based at least in part on a host command to enter the low power mode or on an internal timer of the controller.

8. The SSD of claim 1, wherein exiting the low power mode comprises the controller determining to perform a warm boot based at least in part on data stored in any combination of the voltage regulator, a microsequencer of an integrated circuit comprising the regulator, the controller, and the memory device.

9. An integrated circuit of a solid-state drive (SSD), comprising:
   a microsequencer configured to receive signals from a host device and a controller of the SSD via a data line, wherein a first signal of the signals comprises instructions that a low power mode should not be entered;
   a voltage regulator coupled to the microsequencer, wherein the voltage regulator is configured to:
      receive an instruction to enter the low power mode of the SSD;
      determine whether the host device has indicated that the low power mode should be entered;

enter the low power mode in response to determining that the host device is not transmitting the first signal along the data line indicating that the low power mode should not be entered;

receive an indication to exit the low power mode; and exit the low power mode upon receipt of the indication.

10. The integrated circuit of claim 9, wherein entering the low power mode comprises at least powering down the controller such that the controller does not monitor the host device for the indication to exit the low power mode.

11. The integrated circuit of claim 9, wherein entering the low power mode comprises at least powering off the controller completely.

12. The integrated circuit of claim 9, wherein entering the low power mode comprises at least powering down any combination of one or more power supplies and one or more memory devices of the SSD.

13. The integrated circuit of claim 12, wherein exiting the low power mode comprises at least powering on any combination of the one or more power supplies and the one or more memory devices of the SSD prior to powering on the controller.

14. A method for managing communication, comprising:

receiving, at a solid state drive (SSD), an instruction to enter a low power mode;

sending a first signal indicating that the SSD is entering the low power mode;

receiving a second signal via a data line communicatively coupling the SSD, a regulator, and a host device, wherein the second signal comprises instructions that the low power mode should not be entered;

entering the low power mode in response to receiving the instruction and confirming that the host device is not transmitting the second signal on the data line communicatively coupling the SSD and the host device indicating that the low power mode should not be entered;

receiving, at the SSD, an indication to exit the low power mode; and exiting the low power mode in response to receiving the indication.

15. The method of claim 14, wherein the first signal or the second signal comprises a sideband signal along the data line that is sent and received by the host device.

16. The method of claim 15, wherein the sideband signal is a CLKREQ# signal as specified by the PCI Express (PCIe) standard.

17. The method of claim 15, wherein the sideband signal is a DevSlp signal as specified by the Serial ATA (SATA) standard.

18. The method of claim 14, wherein receiving the indication to exit the low power mode comprises receiving an asserted or de-asserted sideband signal that is sent and received by the host device.

* * * * *